(12) United States Patent
Charkoudian et al.

(10) Patent No.: US 7,919,178 B2
(45) Date of Patent: Apr. 5, 2011

(54) SPATIALLY-CONTROLLED MODIFIED POROUS MEMBRANE

(75) Inventors: John Charkoudian, Carlisle, MA (US); Philip Goddard, Merrimack, NH (US)

(73) Assignee: Millipore Corporation, Billerica, MA (US)

( * ) Notice: Subject to any disclaimer, the term of this patent is extended or adjusted under 35 U.S.C. 154(b) by 0 days.

(21) Appl. No.: 10/394,627

(22) Filed: Mar. 21, 2003

(65) Prior Publication Data
US 2004/0185242 A1    Sep. 23, 2004

(51) Int. Cl.
*B32B 5/18* (2006.01)
*B01D 71/06* (2006.01)
(52) U.S. Cl. ............... 428/308.4; 428/306.6; 428/319.3; 210/500.27; 210/500.42
(58) Field of Classification Search ............... 428/304.4, 428/319.3; 210/500.27, 500.41, 500.42; 264/41
See application file for complete search history.

(56) References Cited

U.S. PATENT DOCUMENTS

| | | | | |
|---|---|---|---|---|
| 4,140,815 A | | 2/1979 | Dege et al. ..................... 427/490 |
| 4,160,452 A | * | 7/1979 | Theeuwes ..................... 424/427 |
| 4,230,463 A | * | 10/1980 | Henis et al. ........................ 95/47 |
| 4,415,455 A | * | 11/1983 | Osei-Gyimah et al. ....... 210/654 |
| 4,442,247 A | * | 4/1984 | Ishikura et al. ................ 523/414 |
| 4,618,533 A | | 10/1986 | Steuck ........................ 428/315.7 |
| 4,751,104 A | * | 6/1988 | Kulprathipanja et al. .... 427/565 |
| 4,772,391 A | * | 9/1988 | Baker et al. ..................... 210/490 |
| 4,818,596 A | * | 4/1989 | Cook et al. ..................... 442/289 |
| 4,824,568 A | | 4/1989 | Allegrezza et al. ............ 210/490 |
| 4,917,793 A | | 4/1990 | Pitt et al. .......................... 210/94 |
| 5,141,806 A | | 8/1992 | Koontz et al. .............. 428/315.5 |
| 5,217,802 A | | 6/1993 | Scaramoutzos ............ 428/304.4 |
| 5,286,382 A | * | 2/1994 | Scarmoutzos et al. ........ 210/490 |
| 5,369,012 A | | 11/1994 | Koontz et al. ................. 435/7.92 |
| 5,468,390 A | | 11/1995 | Crivello et al. ............... 210/490 |
| 5,554,414 A | | 9/1996 | Moya et al. .................... 427/244 |
| 6,112,908 A | * | 9/2000 | Michaels ....................... 210/506 |
| 6,130,175 A | * | 10/2000 | Rusch et al. ..................... 442/77 |
| 6,165,554 A | * | 12/2000 | Halpern et al. ............. 427/248.1 |
| 6,180,168 B1 | * | 1/2001 | Stookey et al. ............... 427/235 |
| 2001/0021413 A1 | | 9/2001 | Tarbet et al. ................... 427/245 |
| 2002/0015875 A1 | * | 2/2002 | Kim ................................ 429/33 |

FOREIGN PATENT DOCUMENTS

WO   WO0189673   11/2001
WO   WO2004/022201   3/2004

OTHER PUBLICATIONS

I. Wang et al., U.S. Pat. Pub. No. 2002/0144595 (Oct. 10, 2002).
A.M. Mayes et al., U.S. Pat. Pub. No. 2002/0155311 (Oct. 24, 2002).
S. Lamon et al., U.S. Pat. Pub. No. 2002/0189455 (Dec. 19, 2002).

* cited by examiner

*Primary Examiner* — Hai Vo

(57) ABSTRACT

This invention relates to a general method to surface modify porous membranes with a free radical polymerized polymer coating in a layer which is less than the thickness of the membrane. Another object of this invention relates to a general method to surface modify porous membranes with a free radical polymerized polymer coating to a predetermined and controlled depth from a first facial surface. Another object of this invention is to provide a general method to surface modify porous membranes with a free radical polymerized polymer coating into a pattern on one or both facial surfaces, the pattern maintaining its form to a controlled depth into the membrane. Membrane modification is spatially controlled through the use of a polymerization preventing agent (PPA), which prevents modification from occurring in defined spatially volumes of the membrane. The invention relates to porous membranes surface modified by the methods described.

21 Claims, 2 Drawing Sheets

SPATIALLY-CONTROLLED MODIFIED POROUS MEMBRANE

FIELD

In general, the present invention relates to porous membranes having a bulk matrix of a first material having a layer of the porous structure coated with a free radical polymerized coating, and in particular, to porous membranes having a bulk matrix of a first material and a surface coating of a second material extending from one facial surface to a controlled partial depth into the membrane.

BACKGROUND

Porous membranes are used for a variety of applications. Porous membranes have a first porous surface, a second porous surface, and a continuous porous structure that extends throughout the membrane from the first to the second surface. The continuous porous structure includes the bulk material matrix and the network of pores. The interface separating the bulk matrix from the pore volume (i.e., the surface of the interior pore network) is known as the interstitial surface. The distance from the first surface to the second surface defines the membrane thickness. Depth is used herein to mean the perpendicular distance from one surface towards the other surface.

Herein, the term "facial surface" shall mean either or both of the first surface or the second surfaces. When discussing surface modifications, "surface" or "surfaces" shall mean both facial and interstitial surfaces.

Porous membranes can be classified as microporous membranes or ultrafiltration membranes on the basis of the size of the pores of the membrane. Generally, the range of pore sizes for microporous membranes is considered to be from approximately 0.05 micron to approximately 10.0 microns, whereas the range of pore sizes for ultrafiltration membranes is considered to be from approximately 0.002 micron to about 0.05 micron. These pore sizes refer to pore diameter for circular or approximately circular pores, or to a characteristic dimension for non-circular pores.

The pore size of a membrane can be denominated by the size of the smallest species (particle or molecule) that cannot pass through the membrane above a specified fractional passage. A common rating is below 10% passage, which corresponds to a 90% cutoff or retention. Other methods are known to those skilled in the art, including image analysis of scanning electron microscopy to obtain pore size distribution characteristics. Microporous membranes are typically used to remove particulates from liquids and gases. An important application of microporous membranes is in sterile filtration of pharmaceutical solutions to remove any bacteria that may be present in the solution. Microporous membranes are also used as sterile gas vents, which allow gas flow but prevent airborne bacteria from passing through the filter. Ultrafiltration membranes are generally used in applications where retention of smaller species is desired. For example, ultrafiltration membranes are used in the biotechnology industry to concentrate proteins, and in diafiltration applications to remove salts and low molecular weight species from protein solutions. Both ultrafiltration and microporous membranes can be fabricated in several forms, including sheets, tubes, and hollow fibers.

Porous membranes are made from a variety of materials, polymers being the most common. Many commercial membranes are made from engineering plastics, such as polyethersulfone, polysulfone, polyvinylidene fluoride, polyethylene, polytetrafluoroethylene, perfluorinated thermoplastic polymers such as poly(tetrafluoroethylene-co-perfluoro(alkylvinylether)) (POLY(PTFE-CO-PFVAE)) or poly(tetrafluoroethylene-co-hexafluoropropylene) (FEP), polypropylene and so forth, to take advantage of their robust thermal, mechanical, and chemical-resistance properties.

Microporous membranes may be classified as symmetric or asymmetric, referring to the uniformity of the pore size across the thickness of the membrane. In the case of a hollow fiber, this is the porous wall of the fiber. Symmetric membranes have essentially uniform pore size across the membrane cross-section. Asymmetric membranes have a structure in which the pore size is a function of location through the cross-section. Another manner of defining asymmetry is the ratio of pore sizes on one surface to those on the opposite surface.

Membrane manufacturers commonly modify the membrane surface (i.e., the first and second surfaces and the interstitial surface) of the bulk matrix material making up the porous membrane to improve the performance of the membrane. For example, U.S. Pat. No. 4,618,533, issued to Michael J. Steuck on Oct. 21, 1986, discloses and claims a composite porous thermoplastic membrane which comprises a porous membrane substrate having an average pore size between about 0.001 and 10 microns formed of a first polymer, the substrate being directly coated on its entire surface with a cross-linked second polymer formed from a monomer polymerized in situ with a free radical initiator on the substrate, where the composite porous membrane has essentially the same porous configuration as the membrane substrate. Such processes are used to transform a membrane having hydrophobic surfaces, which bind large quantities of protein in use, into a membrane having hydrophilic surfaces, which allow self wetting and have low protein binding properties.

Other modified membranes are made to increase the hydrophobicity of the membrane surfaces. U.S. Pat. Nos. 5,217,802 and 5,554,414 describe methods of forming a polymerized coating of a cross-linked second polymer such that it does not wet with a solvent having a surface tension greater than about 21 mN/m. U.S. Pat. App. Pub. No. 2002/0139095 describes oleophobic membranes made by forming a polydimethylsiloxane coating on the surface of a filtration substrate. U.S. Pat. App. Pub. No. 2002/00144595 describes oleophobic and hydrophobic filters made by forming a florosulfone coating on the surface of a filtration substrate. Such membranes are useful for vents.

Methods of membrane modification that use free radical initiated copolymerized coatings have proven to be commercially successful. These methods, exemplified by the teachings of U.S. Pat. No. 4,618,533, have been successfully used to produce a variety of products. Such methods do not significantly change the pore size of the base membrane, and can be used to produce a variety of surface properties, e.g., hydrophilic, hydrophobic, ionic charge, etc.

The examples given above are typical of the multitude of ways membrane manufacturers modify membranes. They have in common that these methods modify all the surfaces of a membrane. Methods of modifying a membrane to a controlled depth from one surface are much less numerous.

Membranes modified to a controlled depth have utility in, for example, 96 well devices for protease assays. MultiScreen DP assay systems from Millipore Corporation (Bedford, Mass.) incorporate a hydrophilic microporous membrane with one facial surface treated to be hydrophobic. The DP membrane plates are recommended for small total volume (<50 µl) and protease assays, particularly for optical detection of filtrates, especially after prolonged (72 hrs.) incubation.

The study of enzyme activity by precipitation assays, in which reagents are incubated, precipitated, washed, and counted, have widespread acceptance. Precipitation techniques simultaneously stop the enzyme reaction and precipitate (insolubilize) the enzyme.

A general procedure for such an assay includes the following steps when using, for example, a 96 well plate device:
1. Add a liquid containing the enzyme sample and reagents to plate wells.
2. Incubate (for enzyme reaction).
3. Add precipitation agent (usually trichloroacetic acid [TCA], typically 5% final concentration) to stop reaction and precipitate proteins.
4. Incubate at 4° C. or on ice.
5. Wash the unreacted, or free, components away. (Collect if needed to quantitate free.)
6. Count precipitate (bound on filter) and/or filtrate (free).

To conduct small volume assays, a membrane having a hydrophilic layer and a hydrophobic layer is especially useful. The liquid sample is applied to and held in the hydrophilic (top) layer during incubation. The bottom hydrophobic layer prevents leakage until a vacuum or pressure force is applied to overcome the hydrophobic force preventing permeation or leakage.

Methods of modifying a facial surface are known.

U.S. Pat. No. 5,468,390, issued to Crivello et al. on Nov. 21, 1995, describes a process for modifying aryl polysulfone membranes by placing an aryl polysulfone membrane into the presence of a hydrophilic vinyl monomer dissolved in a solvent and without any sensitizer or free radical initiator; and exposing the membrane to nonionizing ultraviolet light for a selected period of time for modifying the membrane by chemical grafting and attachment of the monomer at the surface of the membrane by covalent bonding without any sensitizer or free radical initiator. In a related paper (J. Membrane Sci. 105 (1995) 237-247) the authors show that the depth of modification from the facial surface exposed to the ultraviolet light is an excessively long processing time for a commercial process. In addition, ultraviolet light damages aryl sulfone polymer membranes, and such lengthy times would cause excessive damage to the porous structure of the membrane.

U.S. Pat. App. Pub. No. 2002/0155311, filed by Mayes et al. on Dec. 5, 2001, discloses membranes with (facial) surfaces having desired chemical functionality created by surface segregation of a branched component blended with a compatible matrix base component, the branched component having the desired functionality. The patent application is directed to articles having a hydrophobic core material with a hydrophilic surface. No discussion is given, nor contemplated about controlling the depth of modification. Furthermore, the technique is limited to blends of compatible polymers, with one polymer being capable of being entropically driven to the surface.

U.S. Pat. No. 5,369,012, issued to Koontz et al. on Nov. 29, 1994, discloses a portion of an organic polymer article such as a membrane is made hydrophilic by exposing a hydrophobic surface of the article to a depth of about 50 to about 5000 angstroms to atomic oxygen or hydroxyl radicals at a temperature below 100° C., preferably below 40° C., to form a hydrophilic uniform surface layer of hydrophilic hydroxyl groups. This appears directed to the modification of the facial surface, termed "external" in the patent, of non-porous membranes. The very thin modified depth is indicative of this because the vacuum based plasma technology used would immediately penetrate a porous membrane. Also, this process does not produce a free radical polymer coating, but reacts with the base polymer of the membrane. Such reactions generally degrade the physical properties of the polymer.

Somewhat related technology is described in U.S. Pat. No. 5,141,806, issued to S. L. Koontz on Aug. 25, 1992. In the patent, a microporous structure with layered interstitial surface treatments is prepared by sequentially subjecting a uniformly surface-treated structure to atomic oxygen treatment to remove an outer layer of surface treatment to a generally uniform depth, and then surface treating the so exposed layer with another surface treating agent.

As described in U.S. Pat. No. 5,141,806, all surfaces of a porous particle are uniformly treated with a first agent. The uniformly treated particle is then subjected to oxidation with atomic oxygen and/or hydroxyl radicals to remove the surface treating agent from an outer layer of the interstitial (and facial) areas leaving an inner region or layer modified with the first treating agent.

The disclosures and examples of this reference are directed to inorganic silica particles. It is unlikely that polymeric membranes could withstand the oxidation conditions used to remove the treatment without suffering damage to its structure. Further, this process could not be used with asymmetric membranes, as any damage to the fine pore retentive region of the pore size gradient characteristic of asymmetric membranes would destroy the membrane's utility.

U.S. Pat. App. Pub. No. 2002/0189455, filed by Lamon et al. on May 1, 2001, describes oleophobic coated membranes. The disclosure relates to oleophobic filtration media including polymeric membranes and other substrates that are coated with polymerized substituted or unsubstituted para-xylenes. The coating material of preferred embodiments is derived from one or more para-xylene dimers. The dimer in powder form is converted to a gaseous monomer that condenses and polymerizes on substrates at room temperature, forming a parylene coating.

Poly-para-xylene is generally applied to the substrate using a vacuum application system. A para-xylene dimer powder is typically placed in a vacuum system vaporization chamber and is heated to a temperature above 150° C. to convert the powder into vapor form. Next, the dimer in vapor form may be converted in a pyrolysis chamber to reactive para-xylene vapor via pyrolysis at 650° C. The reactive vapor may then be transferred to a polymerization chamber containing the membrane to be coated. The polymerization chamber may be maintained at ambient temperature. The reactive vapor typically polymerizes on the surface of the substrate, forming a uniform parylene coating In a preferred embodiment, deposition of the parylene layer is controlled so as to only partially coat the substrate. For example, a parylene coating may be applied on a membrane on one surface only in a layer not fully penetrating the pores through the entire thickness of the membrane. The parylene layer may also be deposited in a "polka dot" geometry on a substrate. A "polka dot" geometry is defined as a generally regular array of areas having a circular or other shaped profile including deposited parylene and separated from each other by areas of bare substrate with no deposited parylene.

This method is limited to para-xylene polymers, and cannot be adapted to free radical polymerized polymers. Also, since it relies on condensation of the vaporous monomer onto the surfaces, which will occur from the facial surface into the interstitial region, the facial and outer regions will necessarily be more heavily coated, which will tend to plug the surface pores, particularly for small pore membranes, reducing permeability.

The single-film bipolar membranes disclosed in U.S. Pat. No. 4,140,815, issued to Dege et al. on Feb. 20, 1979) comprise a matrix of a polymeric film in intimate dispersed relationship with a relatively high amount of an aromatic polymer, which is suitably cross-linked such as with a di- or poly-functional compound. Highly dissociable cation exchange groups are chemically bonded to the aromatic nuclei from one side of the film, while highly dissociable anion exchange groups are subsequently chemically bonded to the remaining aromatic nuclei on the opposite side. The membrane so composed functions as a durable water-splitting membrane to generate acid and base from dissolved salts by electrodialysis. Such single film bipolar membranes are prepared from pre-swollen films containing a relatively high amount, i.e., at least 15% of an insoluble cross-linked aromatic polymer. Under controlled conditions, highly dissociable cationic-exchange groups are chemically bonded to the aromatic nuclei to a desired depth of the film from one side only; subsequently, highly dissociable anion-exchange groups are chemically bonded to the unreacted aromatic nuclei on the other side of the film. Bipolar membranes are by their nature non-porous.

Accordingly, there is a need for a method to modify porous membranes to a predetermined depth form one facial surface with free radical polymerized polymer coatings. Furthermore, there is a need for integral membrane products having a functional modification on surfaces of a predetermined and controlled region of the interstitial volume, including one facial surface. An integral membrane has a unified structure, such as a single sheet or hollow fiber membrane. This also includes composite membranes, such as described in U.S. Pat. No. 4,824,568, and membranes, such as described in PCT Pat. App. Pub. No. WO 0189673.

For ease of description, the predetermined and controlled region of the interstitial volume, usually including one facial surface, will be termed herein a "a layer".

There is also a need for modified membranes having a desired surface pattern where the modification is prevented from forming, and with this prevention being extended to a controlled depth into the membrane.

SUMMARY

An object of this invention is to provide a general method to modify porous membranes with a free radical polymerized polymer coating to a predetermined and controlled depth from a first facial surface. Another object of this invention is to provide a general method to modify porous membranes with a free radical polymerized polymer coating in a layer at a predetermined and controlled depth from each facial surface. Another object of this invention is to provide a general method to modify porous membranes with a free radical polymerized polymer coating into a pattern on one surface, the pattern maintaining its form to a controlled depth into the membrane. Another object of this invention is to provide a general method to modify porous membranes with a free radical polymerized polymer coating into a pattern on both surfaces, the patterns being the same or different, the patterns maintaining their form to a controlled depth into the membrane from the surface at which they are formed. An object of this invention is to provide for modified membranes that result from the general methods.

In the general method for producing a free radical polymerized polymer coating to a predetermined and controlled depth from a first facial surface, a porous membrane is optionally wetted with a wetting liquid. The completely wetted membrane is then optionally exchanged for the solvent in which the desired membrane modifying reaction is to occur. The membrane is then exchanged for a solution comprising at least one free radical polymerizable monomer, an optional polymerization initiator and cross-linking agent in a solvent for these three constituents. The membrane is then contacted from one facial surface with an agent that diffuses from that facial surface to a controlled and desired depth and is capable of preventing polymerization from occurring, i.e., a polymerization preventing agent (PPA). A preferred PPA is oxygen. Preferably, the PPA operates to prevent polymerization initiation from occurring. The PPA may also operate by limiting polymerization to low molecular oligimeric species which are easily removed in subsequent washings. The membrane is exposed to an energy source, such as, but not limited to, thermal, ultraviolet light, electron beam or gamma radiation, either subsequently to PPA diffusion, or while diffusion is occurring, which initiates polymerization in the interstitial volume and second facial surface not diffused to by the PPA so as to form the crosslinked polymer coating on membrane surfaces in the interstitial volume not diffused into by the PPA and second surface and not in the volume occupied by the PPA or the facial surface contacted with the PPA. To form a layer at a depth from each facial surface, both facial surfaces would be exposed to the PPA sufficiently so that the PPA would diffuse to a depth from each facial surface sufficient to leave an undiffused layer in the membrane thickness.

In another embodiment of the general process, the membrane facial surface contacted with the PPA is covered with a patterned mask with open areas, allowing the PPA to diffuse through the open areas, but not where the mask covers the membrane. This embodiment results in a pattern of modification in which the covered areas are modified with a free radical polymerized polymer, while the open areas give an unmodified are to a depth controlled by the extent of the diffusion process. The mask can be a plastic or metal film cut to the desired pattern. In some embodiments, the mask or mask design can be printed or painted onto the surface of the membrane to be in contact with the PPA. Patterns can be formed on both sides by the use of masks, etc., on each facial surface.

A key feature of this process lies in the use of the PPA to control the free radical polymerization to a depth desired. In the prior art, any attempts at control are due to extent to which the reaction can penetrate into the membrane. However, while penetration brings the reaction deeper into the depth of the membrane, the outer facial surface and regions close-by are continuously exposed to the reaction. The relatively longer reaction time can cause differences in properties in different regions of the depth, making product control difficult. In contradiction to this, this present invention uses a PPA to prevent polymerization where surface modification is not desired. This allows polymerization to occur uniformly in the depth not containing the PPA.

In an embodiment, a hydrophobic membrane is modified to have a layer of a functional free radical polymerized crosslinked polymer coating. Such functional coatings include, but are not limited to hydrophilic, hydrophobic, ionically charged, and ligand containing.

In an embodiment, a uniformly hydrophilically modified porous membrane, as for example, described in U.S. Pat. No. 4,618,533, is further modified to have a hydrophobic or functional layer.

In an embodiment, a uniformly ionically charge modified porous membrane, is further modified to have layer of a second ionic charge.

In an embodiment, the hydrophobic layer will have a surface such that it does not wet with a solvent having a surface tension greater than about 16 mN/m.

In an embodiment, a uniformly hydrophilically modified porous membrane, as for example, described in U.S. Pat. No. 4,618,533, is further modified to have an ionically charged layer.

In an embodiment, a hydrophilic membrane modified to have a hydrophobic layer will be suitable for use in a protease assay.

In other embodiments, the layer or layers are formed in a pattern or patterns.

DETAILED DESCRIPTION

Figure 1:
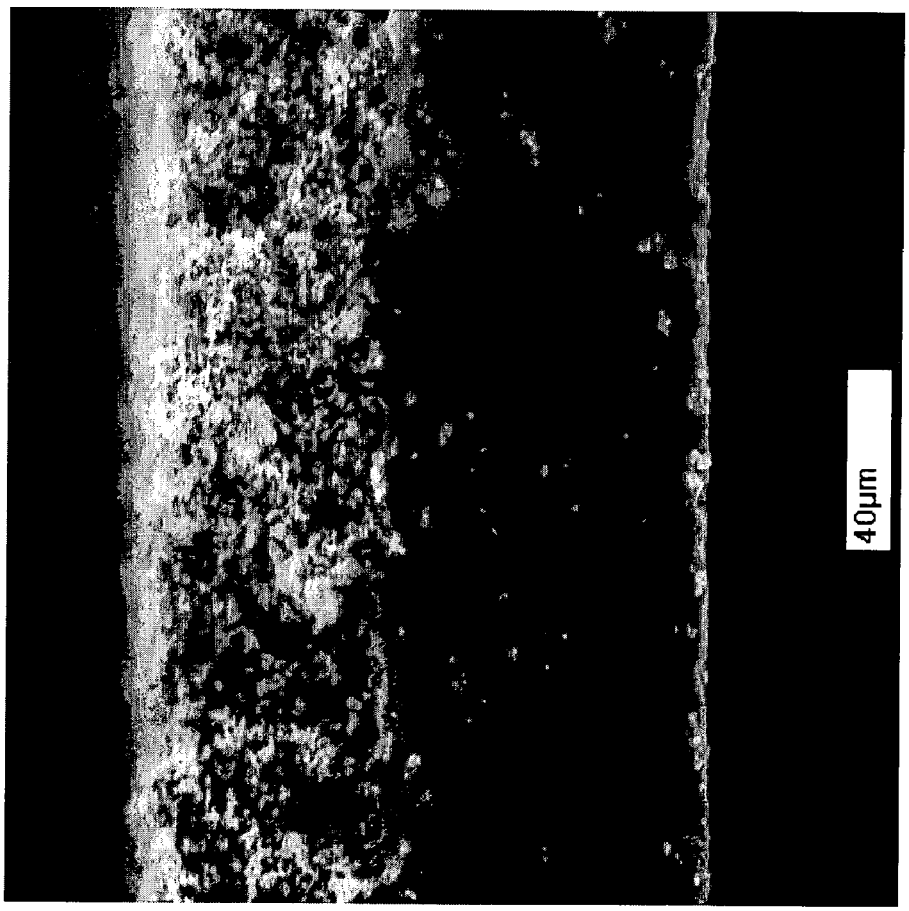
FIG. 1 is a cross-section view of the membrane of Example 1.

In general, the present invention provides a method that can be used to produce surface modified porous membranes in which the modification is spatially controlled to occur within a desired volume of the membrane, and if further desired, to occur in designed patterns.

Membranes made by this method may have their surface modified from at least one facial surface to a controlled depth into the membrane porous structure, of a depth less than the total thickness of the membrane. This will result in a membrane having a layer of modified surfaces.

Membranes modified to a controlled depth have utility in, for example, 96 well devices for protease assays. MultiScreen DP assay systems from Millipore Corporation (Bedford, Mass.) incorporate a hydrophilic microporous membrane with one facial surface treated to be hydrophobic. The DP membrane plates are recommended for small total volume (<50 μl) and protease assays, particularly for optical detection of filtrates, especially after prolonged (72 hrs.) incubation. The study of enzyme activity by precipitation assays, in which reagents are incubated, precipitated, washed, and counted, have widespread acceptance. Precipitation techniques simultaneously stop the enzyme reaction and precipitate (insolubilize) the enzyme.

Also, membranes made by this method may have their surface modified in a pattern from at least one facial surface to a controlled depth into the membrane porous structure, of a depth less than the total thickness of the membrane.

Membranes modified with a pattern to a controlled depth have utility in, for example, in arrays for protein immobilization. Arrays are used to provide an orderly arrangement of samples, especially in a matrix which can be indexed and identified in robotic methods. In a protein binding array, each cell of the array will have a specific binding chemistry. At low pH and with low salt content solutions, proteins can be bound to positively charged groups on the array through electrostatic interaction of positively charged amino acids such as lysine, arginine and histidine. At high pH and with low salt content solutions, negatively charged groups on the array will bind proteins through electrostatic interaction of negatively charged amino acids such as aspartic acid and glutamic acid. Antibodies are bound to the array surface to test for specific interactions with proteins.

In the general method for producing a free radical polymerized polymer coating to a predetermined and controlled depth from a first facial surface, a porous membrane is optionally wetted with a wetting liquid. The completely wetted membrane is then optionally exchanged for the solvent in which the desired membrane modifying reaction is to occur. The membrane is then exchanged for a solution comprising at least one free radical polymerizable monomer, an optional polymerization initiator and cross-linking agent in a solvent for these three constituents. The membrane is then contacted from one facial surface with an agent that diffuses from that facial surface to a controlled and desired depth and is capable of preventing polymerization from occurring, i.e., a polymerization preventing agent (PPA). A preferred PPA is oxygen. Preferably, the PPA operates to prevent polymerization initiation from occurring. The PPA may also operate by limiting polymerization so that only low molecular oligimeric species are formed which are easily removed in subsequent washings. The membrane is exposed to an energy source, such as, but not limited to, thermal, ultraviolet light, electron beam or gamma radiation, either subsequently to PPA diffusion, or while diffusion is occurring, which initiates polymerization in the interstitial volume and second facial surface not diffused to by the PPA so as to form the crosslinked polymer coating on membrane surfaces in the interstitial volume not diffused into by the PPA and second surface and not in the volume occupied by the PPA or the facial surface contacted with the PPA.

In certain embodiments of the present invention, both facial surfaces can be contacted with a PPA, to produce a modified layer at a depth in the membrane.

In other embodiments, the membrane facial surface contacted with the PPA is covered with a patterned mask with open areas, allowing the PPA to diffuse through the open areas, but not where the mask covers the membrane. This embodiment results in a pattern of modification in which the covered areas are modified with a free radical polymerized polymer, while the open areas give an unmodified area to a depth controlled by the extent of the diffusion process. The mask can be a plastic or metal film cut to the desired pattern. In some embodiments, the mask or mask design can be printed or painted onto the surface of the membrane to be in contact with the PPA.

Also, the depth of the effect of the PPA can be controlled by varying the concentration of the PPA. By varying the diffusional driving force, varying depth effects are possible for the same contact time.

Furthermore the PPA can be applied in a printable format, so that the printed area is unmodified in a subsequent surface modifying polymerization. The PPA can be contained in a liquid, as a solution or a dispersion, or the PPA can be used as a pure substance.

In some embodiments, the mask or mask design can be applied on both facial surfaces, of the same or different design, to produce patterned layers on both sides.

Other embodiments, using combinations of the methods described above, can be adapted by a practitioner to make layer modified membranes not explicitly described herein.

A key feature of the invention lies in the use of the PPA to control the free radical polymerization to a depth desired. In the prior art, any attempts at control are due to extent to which the reaction can penetrate into the membrane. However, while penetration brings the reaction deeper into the depth of the membrane, the outer facial surface and regions close-by are continuously exposed to the reaction. The relatively longer reaction time can cause differences in properties in different regions of the depth, making product control difficult. In contradiction to this, this present invention uses a PPA to prevent polymerization where surface modification is not desired. This allows polymerization to occur uniformly in the depth not containing the PPA.

The steps of the general method comprise: providing a porous membrane substrate; optionally washing said porous membrane substrate with a wetting liquid to wet the surfaces thereof; optionally washing said wet porous membrane substrate with a second wetting liquid to replace said first wetting liquid, leaving said porous membrane substrate wetted with said second liquid; contacting a facial surface of said porous membrane substrate with a solution containing at least one monofunctional free radical polymerizable monomers, at least one polyfunctional free radical polymerizable monomer, and optionally one or more polymerization initiators; contacting the membrane from at least one facial surface with an agent that diffuses from that facial surface, i.e., a polymerization preventing agent (PPA); controlling the depth of the diffusion of the PPA so as to prevent polymerization from occurring in the volume into which the PPA has diffused; polymerizing said monomers to form a crosslinked coating in the volume of the membrane not occupied by the PPA, and washing the membrane. A mask is used for patterned diffusion, if desired.

Porous membranes are available in a variety of materials. Porous membranes are commercially produced form ceramic materials, carbon, and metallic materials. Polymeric membranes are a preferred embodiment of this invention. Representative polymers that can be used to manufacture porous membranes useful in the present invention include polysulfone polymers, preferably aromatic sulfone polymers, such as polysulfone and polyethersulfone polymers. Other useful polymers are perfluorinated thermoplastic polymers including polytetrafluoroethylene and polyvinylidene difluoride, polyolefin polymers such as polyethylene, ultrahigh molecular weight polyethylene and polypropylene, cellulosic polymers such as cellulose acetate and cellulose nitrate, polyvinyl chloride, polyvinyl fluoride, polyacrylonitrile, polyamides, and polyesters such as polyethyleneterepthalate and polycarbonate. In a particularly preferred embodiment, the porous membrane is a polyvinylidene difluoride membrane. Those skilled in the art will readily be able to identify other polymers useful in the formation of porous membranes suitable for the present invention.

The porous membrane can be a hydrophobic or a hydrophilic membrane. The porous membrane can be a surface modified membrane.

As used herein, the term "porous membrane" includes both microporous membranes and ultrafiltration membranes. The ultrafiltration and microporous membranes of the invention can be in any of several forms, including sheets, tubes, and hollow fibers.

Herein, the term "facial surface" shall mean either or both of the first surface or the second surfaces. When discussing surface modifications, "surface" or "surfaces" shall mean both facial and interstitial surfaces.

In general, porous membranes can be skinned or unskinned. A skin is a relatively thin, dense surface layer integral with the substructure of the membrane. In skinned membranes, the major portion of resistance to flow through the membrane resides in the thin skin. In both microporous and ultrafiltration membranes, the surface skin, where present, contains pores leading from the facial surface to the continuous porous structure of the membrane below the skin. For skinned microporous and ultrafiltration membranes, the pores represent a minor fraction of the facial surface area. In contrast, an unskinned membrane will be porous over the major portion of the facial surface. The facial surface porosity of the membrane (that is, the arrangement of pores of the facial surface of the membrane as viewed by, for example, scanning electron microscopy; "SEM") can be single pores that are relatively evenly distributed on the facial surface of the membrane, or can be discrete areas of porosity, or mixtures thereof. As used herein, the term "surface porosity" as applied to an facial surface of a membrane is the ratio of the area defined by the pore openings of the facial surface to the total surface area of the facial surface.

Microporous membranes useful in the practice of the present invention are classified as symmetric or asymmetric, referring to the uniformity of the pore sizes across the thickness of the membrane, or, for a tubular or hollow fiber membrane, across the porous wall of the fiber. As used herein, the term "symmetric membrane" means a membrane that has substantially uniform pore size across the membrane cross-section. The term "asymmetric membrane" means a membrane in which the average pore size is not constant across the membrane cross-section. For example, in asymmetric membranes pore sizes can vary smoothly or discontinuously as a function of location through the membrane cross-section. As will be appreciated, included within the definition of "asymmetric membranes" are membranes that have a ratio of pore sizes on one facial surface to those on the opposite facial surface that are substantially greater than one Reactant solutions should preferably wet the all surfaces of the porous membrane. Where the surface tension of the reactant solution is not low enough to sufficiently wet the membrane surfaces, a pre-wetting or washing step can be applied. In some preferred embodiments the porous membrane is first washed with a washing liquid which completely wets the entire porous membrane surface. Preferably, the washing liquid does not swell or dissolve the porous membrane, and also can preferably be exchanged with the reactant solution. In a preferred embodiment using an aqueous reactant solution the wetting liquid can be an organic liquid or an organic-water composition having lower surface tension than the surface tension required to wet the porous membrane. Examples of suitable wetting liquids are lower monohydric alcohols (methanol, ethanol, isopropanol), and alcohol-water solutions, preferably methanol-water, ethanol-water, or isopropanol-water solutions. Where a washing step is it is sometimes desirable to perform a second washing step. For example, where one or more components of the wetting liquid can interfere with the polymerization or crosslinking reactions, a second washing step can be used to remove the washing liquid and replace the same with a second washing liquid one that does not interfere with the polymerization or crosslinking reactions. The second wash is usually the solvent used in the reactant solution. For example, if an aqueous reactant solution is to be used, the porous membrane having been washed and wetted with the wetting liquid described, is subsequently washed with water to remove the first wetting liquid and produce a water filled porous membrane. The wet porous membrane is then contacted with the reactant solution (for example by soaking in the reactant solution) to produce the desired reactant composition in the pores of the porous membrane and on the facial surfaces. Preferably, the first and second washing steps, where desired, are performed at ambient temperatures, for instance, 20° C. to 30° C., and preferably for times from a few seconds to a few minutes.

If the reactant solution for forming the coating wets the porous membrane sufficiently, due to containing an organic solvent for that purpose, or if the concentration of reactants in the reactant solution is sufficient to lower the surface tension of the solution to allow the reactant solution to fully wet the porous membrane, then neither of the washing steps are required. Thus, the reactant solution can contain one or more additives which lower the surface tension of the reactant solution sufficiently to avoid such washing steps, and which do not interfere with the subsequent polymerization reaction. Preferred examples of such additives include ethyl hexyl diol, propylene carbonate, tripropyleneglycol methyl ether and 2-methyl-2,4-pentane diol. The amount of additive to the reactant solution required to achieve proper wetting depends on the amount and type of monomers and initiators being used, and will be readily determinable by those of skill in the art without undue experimentation. The reactant solution for the coating includes solvent, at least one monofunctional monomers, at least one polyfunctional crosslinking monomer, and, optionally, one or more initiators. The choice of solvent for the reactant solution depends on the choice of monomers and optional initiators. The solvent preferably dissolves the reactants and the optional initiator; does not interfere or hinder the polymerization reaction, and does not attack the porous membrane. A particularly preferred solvent is water.

The ratio of amount of crosslinker monomer to the total amount of monofunctional monomers is from about 1 to about 10, more preferably from about 2 to about 6.

The polymerization of the monofunctional monomers and the crosslinking polyfunctional monomers of the present invention can be achieved through free radical initiation and propagation. In some preferred embodiments, one or more free radical initiators can be included in the in the reactant solution containing the monomers to facilitate polymerization. Any of a wide variety of initiators known in the art will find applicability in the present invention. In some preferred embodiments the initiator or initiators are water soluble. In other preferred embodiments, for example when wetting reactant solutions are used, sparingly water soluble initiators are preferred.

Those of skill in the art will readily be able to determine suitable initiators for a given reactant solution. Examples of suitable initiators include, for example, ammonium persulfate, potassium persulfate, azobis (4-cyanovaleric acid, Irgacure 2959 (Ciba Specialty Chemicals, Hawthorn, N.Y.), 2,2'-azobis(2-amidino-propane)hydrochloride and the like. Preferably, the initiator or initiators are used in the range of from about 0.1% to about 1% by weight, based on the total reactant solution.

After the surface of the porous membrane is contacted with (i.e., is saturated with) the reactant solution, excess reactant solution removed from the facial surfaces, while still leaving such facial surfaces wetted with solution. For small sheets, excess reactant solution can be removed by, for example, placing the saturated sheet between two layers of plastic film and rolling out excess liquid with a rubber roll, such as, for example, a hand brayer. In processing continuous sheets of porous membranes, removal of excess liquid can be performed with air knives, which direct a stream of air at the facial surfaces. The force of the air stream sweeps away the excess reactant solution. One preferred technique is to run the sheet between two pressure controlled contacting rolls, at least one of which is elastomer coated, which rotate in the same direction as the sheet. The amount of liquid left in the sheet can be accurately controlled by adjusting the pressure of the contacting rolls. Other means of removing excess reactant solution are readily available to workers in the field.

Monomers capable of being polymerized by free radical polymerization and cross-linked by free radical polymerizable polyfunctional monomers can be used in this method to form the modified membranes. A complete list of suitable polymerizable monomers would be overly extensive, but practitioners will be familiar with the necessary chemistry to form the desired functionality or surface proerties desired. Such monomers include, but are not limited to, the hydroxyalkyl acrylates or methacrylates including 1-hydroxyprop-2-yl acrylate and 2-hydroxyprop-1-yl acrylate, hydroxypropylmethacrylate, 2,3-dihydroxypropyl acrylate, hydroxyethylacrylate, hydroxyethyl methacrylate or the like or mixtures of these. Other polymerizable monomers which can be utilized are acrylamides, methacrylamides, ethacrylamides, including dimethylacrylamide and diacetone acrylamide. Vinylpyrrolidone may be used. Positively or negatively charged ion containing monomers, monomers with affinity groups, or monomers with significant hydrophobic character may be used, such as, (3-(methacryloylamino)propyl)trimethyl-ammonium chloride, (3-acrylamidopropyl)trimethylammonium chloride, 2-acrylamido-2-methyl-1-propanesulfonic acid and aminopropylmethacrylamide. Examples of cross-linking agents for acrylates, acrylamides, methacrylates or methacrylamides include difunctional acrylates, methacrylates or acrylamides such as tetraethyleneglycoldiacrylate, glycidyl diacrylate, ethoxylated trimethylolpropanetriacrylate or methylene bisacrylamide or the like. In some cases of cross-linking agents having difunctionality or higher functionality, these agents can be utilized without an additional monomer in the coating of this invention.

After the excess reactant solution is removed, polymerization of the reactant solution is then begun by exposing the wet porous membrane to an energy source, such as heating, ultraviolet light, electron beam or gamma radiation. Free radical polymerization initiated by heat is typically achieved by heating the saturated membrane to at least about 60° C. and maintaining that temperature for from about 0.1 to about 10 minutes, preferably between about 1 to about 2 minutes. Higher temperatures can be used depending on the combination of initiator and monomers used, up to the point where boiling or too rapid vaporization adversely affects the polymerization reaction.

In some preferred embodiments, ultraviolet light is used to initiate the in situ polymerization reaction. Preferably, the porous membrane saturated with the reactant solution (which optionally contains one or more initiators) is illuminated with an ultraviolet light source such as Fusion Systems F600 (Rockville, Md.) with an "H" bulb. Filters can be used to reduce or remove undesirable wavelengths which may cause unwanted damage to the porous membrane being modified. Those of skill in the art will appreciate that the balance of exposure time to the UV lights with lamp intensity to optimize polymerization conditions will be a matter of routine experimentation. Generally, with a 600 watt source, exposure times of from about 2 seconds to about 10 seconds, preferably from about 3 seconds to about 5 seconds, will be suitable.

In some preferred embodiments, electron beam technology is used to initiate polymerization, for example by methods described in U.S. Pat. No. 4,944,879. Typically, a web or individual sample is passed through a curtain of electrons generated by an electron beam processor. The processor delivers the desired dose at from about 100 kV to about 200 kV. The moving web or sample is transported at a speed suitable to give the desired exposure time under the curtain. Exposure time, combined with dose, determines the dose rate. Typical exposure times are from about 0.5 seconds to about 10 seconds. Dose rates generally are from 0.05 kGy (kiloGray) to about 5 kGy.

In further preferred embodiments, the polymerization of the monomers of the reactant solution can be initiated by gamma irradiation. Typically, in this method, a wound roll of monomer saturated porous membrane is irradiated. The roll can be passed through the reactant solution and rolled up, or a previously wound up roll can be immersed in the reactant solution. Preferably, the reactant solution is degassed, that is, treated so as to remove air, and particularly oxygen, from the solution. In some preferred embodiments, degassing is accomplished by replacing air with an inert gas such as helium, nitrogen or argon. In other preferred embodiments, degassing is accomplished by reducing the pressure over the monomer solution, for example with a vacuum pump. The degassed monomer solution laden roll is then sealed with a sealing material so as to remain in a degassed state, and then irradiated at the desired dose. Preferably, the sealing material will not be degraded by the irradiation, and also does not significantly retard the gamma rays. A wide variety of materials are known in the art to be useful as sealing materials, for example many plastics, and borosilicate glass.

Typically, total dosages of about 0.02 to about 1.0 kGy are suitable. Typical exposures of about 5 to about 500 kilorads per hour, more preferably about 5 to about 150 kilorads per hour can be used, with typical irradiation times of from about 4 to about 60 hours. Those of skill in the art will readily be able to determine the proper balance of dose rate and time to arrive at the total dosage.

It is known that the presence of oxygen adversely affects free radical polymerization reactions. It is one aspect of this invention that use is made of this usually deleterious effect to control polymerization to a desired volume or space within the membrane. In a preferred embodiment, concerning flat sheet membranes, the reactant solution ladened sheet has one facial surface is covered with an oxygen impermeable film, while the other facial surface is left exposed to atmospheric air. Oxygen from the atmosphere diffuses into the solution, to a depth that can be controlled. The depth of diffusion is dependent on several variables, including diffusivity of oxygen in the reactant solution, concentration of oxygen in the surrounding atmosphere, and time of contact of the exposed surface to the atmosphere. A practitioner can in principle change the depth by changing diffusivity, for example, by changing solvent, if such a change is practical. The content of oxygen can be controlled by diluting with an inert gas, as nitrogen, or by adding oxygen to the surrounding atmosphere. The contact time can be changed by changing the speed of the process, if a continuous web process is being run.

While oxygen is a preferred PPA, other reagents could be added to the atmosphere to have a similar effect. Ozone and chlorine gas are examples of gaseous reagents that could be used as PPA's.

It is also conceivable that the reactant solution ladened sheet could be covered on one facial surface and processed through an immiscible liquid containing a PPA dissolved in the immiscible liquid. Examples of possible liquid borne PPA's are diphenylpicrylhydrazil, and copper chloride. Other examples are given in "Principles of Polymerization" $3^{rd}$ Ed., page 263, George Odian; Wiley-Interscience, John Wiley & Sons; Publishers.

Another method takes advantage of the fact the a PPA will react with an optional free radical initiator. As shown in Example 5, further on in this specification, by controlling the concentration of the optional free radical initiator, the inventor has been able to control the depth of PPA diffusion. This is due to the fact that the PPA is used up as it diffuses in proportion to the concentration of any free radical initiator used.

To produce a pattern using the techniques of the present invention, a practitioner would cover one facial surface as above with an impermeable film or sheet and cover the opposing facial surface with a sheet having openings in the desired pattern. Diffusion of the PPA will occur through the openings, forming a pattern in depth where no polymerization has occurred.

A practitioner could chose to have a patterned formed on both sides of a flat sheet membrane by applying a patterned sheet, which could be the same or of a different pattern, on each side. A practitioner could even chose to leave both facial surfaces uncovered and form the modification in the interior of the membrane.

A practitioner is not limited to a single modification. For example, a membrane can be modified uniformly with a first polymer coating and then spatially modified with a second coating. Also, a first spatial coating can be coated with a second spatial coating which covers only a subpattern of the first pattern.

It will be evident to a skilled practitioner that many variations of membrane modification can be accomplished by the methods of the present invention.

The methods of the invention are applicable to the fabrication of tubular and hollow fiber membranes. Coating methods are known from the textile fiber and monofilament industries which can be adapted to this process.

It is not the intent of the discussion of the present invention to exhaustively present all combinations, substitutions or modifications that are possible, but to present representative methods for the edification of the skilled practitioner. Representative examples have been given to demonstrate reduction to practice and are not to be taken as limiting the scope of the present invention. The inventor seeks to cover the broadest aspects of the invention in the broadest manner known at the time the claims were made.

METHODS

An Electroscan ESEM 3 (available from Philips Electron Optics) was used to evaluate the wetting properties of membrane samples. A portion of membrane from the treated sample was freeze fractured (as described further below), then mounted for cross sectional analysis on a Peltier stage cooled to 5° C. The cross sectioned sample was oriented with the hydrophobic side to the top of the of the image frame. The ESEM chamber was pumped down from atmosphere to a set pressure of 5 Torr and then flushed with water vapor to 10 Torr using the flood control. The flood control was then released. When the chamber pressure again reached 5 Torr, it was flushed again to 10 Torr with water vapor. This procedure was followed three times in order to exchange room air with water vapor in the chamber. The chamber pressure was then set to 7 Torr. Fine adjustments to both chamber pressure and stage temperature were made to maintain liquid water on the sample stub. After the membrane wet, a representative image was acquired. Images were acquired using a beam accelerating voltage of 15 KV @ a magnification of 500x. Images were acquired through the Orion Image Acquisition System.

The cross-sectional image showed the wettable region as dark and featureless, because the ESEM beam does not penetrate the water that condenses in the hydrophilic regions.

Sample preparation (i.e., freeze fracturing) commences by laying a sample flat on a suitable sample preparation table. A rectangular piece approximately 3-5 mm×15-20 mm in size is cut from the sample. The rectangle piece is held by tweezers about ¼ of the way up from its base, and submerged in $LN_2$ until sample's temperature reaches equilibrium. Equilibrium typically occurs in about 10 seconds. The sample is then removed from the liquid nitrogen bath and fractured immediately by bending a using second pair of tweezers. The fractured piece is placed flat on the sample preparation table, and cut approximately 2 mm perpendicular to the fracture. The cut sample is mounted upright (fractured edge up) on a sample stub using conductive adhesive, then sputter coated with a conductive metal at a thickness of approximately 20 to 30 Å, whereupon it is essentially ready for placement in an SEM chamber for image acquisition. Extent of magnification is, of course, sample dependent.

EXAMPLES

Example 1

Hydrophilic 0.65 u Durapore (polyvinylidene fluoride microporous membrane, Millipore Corporation, Bedford, Mass.) is treated with a formulation consisting of 3.5% zonyl fluoroacrylate (i.e., 2-(N-ethylperfluorooctanesulfonamido) ethyl acrylate and analogs, available from Dupont Corporation, Wilmington, Del., under the tradename ZonylTAN), 0.5% hexanedioldiacrylate, and 0.1% Irgacure 621 (i.e., 2,2 dimethoxy-2-phenylacetophenone, available from Ciba Specialty Chemicals, Hawthorn, N.Y.) in decamethyltetrasiloxane. The membrane is placed on a sheet of polyethylene. No cover sheet is applied to the opposing facial surface. The membrane is transported through a Fusion Systems F600 (Rockville, Md.) UV unit at ten feet per minute with UV light exposure only directed toward the side covered by the polyethylene sheet. The uncovered side is not directly exposed and is in direct contact with the atmosphere that contains, among other things, oxygen and ozone. After emerging from the unit, the membrane is immediately placed in methanol to wash out unreacted species and other noncovalently attached molecules.

After drying, the membrane displays two sided properties. The side that was exposed to oxygen and ozone remains very hydrophilic, while the other side has become very hydrophobic. A drop of water placed on the hydrophilic side wicks in and rapidly spreads out in a radial direction. Methanol does not wet the hydrophobic side. Environmental Scanning Electron Microscopy (ESEM) revels that about half (60 microns) of the membrane is hydrophilic, while the remaining half is hydrophobic. A copy of the ESEM is shown in FIG. 1. The darker, homogeneous layer is the hydrophilic zone.

Example 2

Hydrophilic 0.65 u Durapore (DVPP) is treated with a superphobic formulation consisting of 3.5% DuPont zonyl fluoroacrylate, 0.5% hexanedioldiacrylate, and 0.1% Irgacure 621 in decamethyltetrasiloxane. The membrane is placed on a sheet of polyethylene. A polyethylene cover sheet is applied that has open spaces corresponding to a pattern. This pattern can be in any shape. In this example the pattern is made by cutting out from the polyethylene sheet a lane about 2 mm in width ending in a circle about 5 mm in diameter. The membrane is transported through a Fusion systems UV unit at ten feet per minute with UV light exposure only directed toward the side covered by the unpatterned polyethylene sheet. The side covered by the patterned polyethylene sheet is not directly exposed and is in direct contact with the atmosphere that contains, among other things, oxygen and ozone. After emerging from the unit, the membrane is immediately placed in methanol to wash out unreacted species and other noncovalently attached molecules.

The entire membrane is hydrophobic except for the area corresponding to the cut-out pattern, This region is hydrophilic and wets with water to a depth of about 60 microns.

Example 3

In this example the depth of the hydrophobic layer or region is reduced by changing the concentration of the formulation ingredients. To make the hydrophobic region smaller, the active ingredients in the formulation are decreased in concentration. Hydrophilic 0.65 u Durapore (DVPP) is treated with a superphobic formulation consisting of 2% DuPont zonyl fluoroacrylate, 0.32% hexanedioldiacrylate, and 0.056% Irgacure 621 in decamethyltetrasiloxane. The membrane is placed on a sheet of polyethylene. No cover sheet is applied to the opposing facial surface. The membrane is transported through a Fusion systems UV unit at ten feet per minute with UV light exposure only directed toward the side covered by the polyethylene sheet. The uncovered side is not directly exposed and is in direct contact with the atmosphere that contains, among other things, oxygen and ozone. After emerging from the unit, the membrane is immediately placed in methanol to wash out unreacted species and other noncovalently attached molecules.

Figure 2:
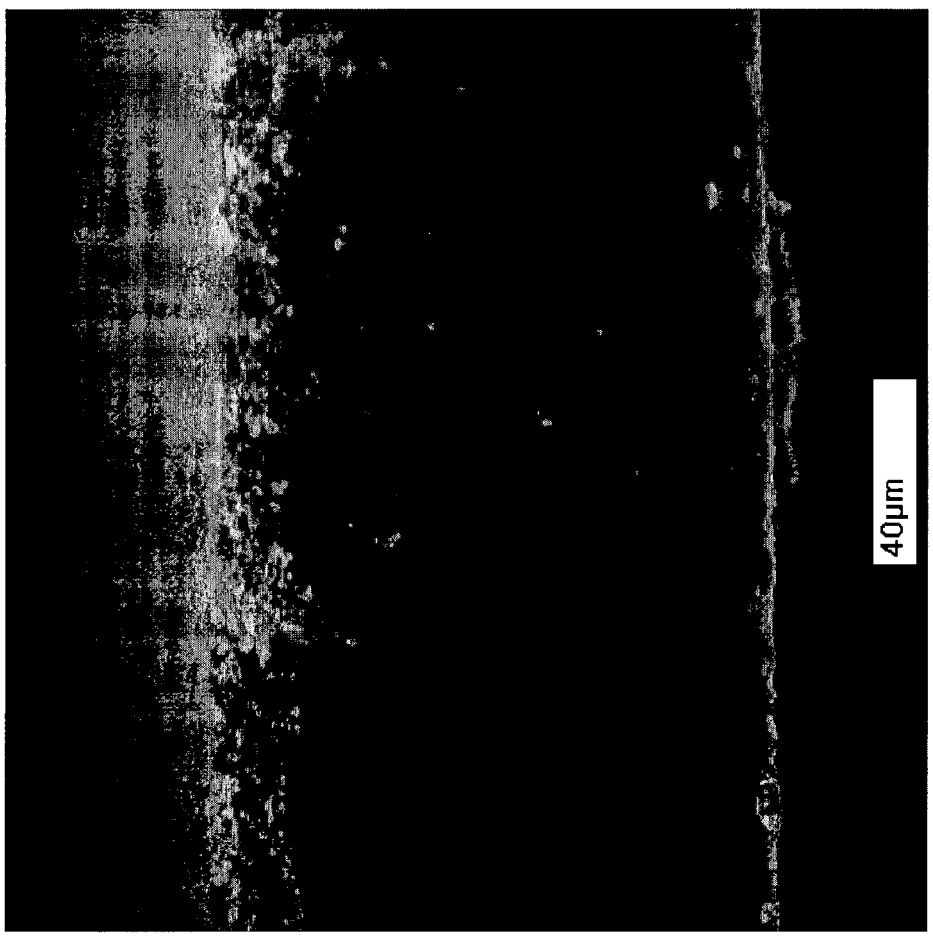
FIG. 2 is a cross-section view of the membrane of Example 3.

After drying, the membrane displays two sided properties. One side is very hydrophilic, while the other is very hydrophobic. A drop of water placed on the hydrophilic side wicks in and rapidly spreads out in a radial direction. Methanol does not wet the hydrophobic side. Environmental Scanning Electron Microscopy (ESEM) revels that about 85% of the membrane forms the hydrophilic layer, while the remaining 15% is hydrophobic. A copy of the ESEM is shown in FIG. 2. The darker, homogeneous layer is the hydrophilic zone.

Example 4

Hydrophilic 0.65 u Durapore (DVPP) is treated with a formulation containing a positively charged monomer. The formulation consists of 12% acrylamidopropyltrimethylammonium chloride, 1% methylenebisacrylamide, 0.2% Irgacure 2959 (i.e., 4-(2-hydroxyethoxy)phenyl-(2-propyl)ketone, available from Ciba Specialty Chemicals), and 86.8% water. The membrane is placed on a sheet of polyethylene. No cover sheet is applied. The membrane is transported through a Fusion systems UV unit at ten feet per minute with exposure only directed toward the side covered by the polyethylene sheet. The uncovered side is not directly exposed and is in direct contact with the atmosphere that contains, among other things, oxygen and ozone. After emerging from the unit, the membrane is immediately placed in water to wash out unreacted species and other noncovalently attached molecules.

A sample of the membrane is placed in a solution of the negatively charged dye, Ponceau S (i.e., (3-hydroxy-4-(2-sulfo-4-(4-sulfophenylazo)-phenylazo)-2,7 naphthalenedisulfonic acid tetrasodium salt, available from Sigma-Aldrich, Milwaukee, Wis.). After treating the sample for 15 minutes and washing with water until no further dye is removed the sample shows that the side covered by the polyethylene sheet is stained red and therefore is positively charged, while the side uncovered by the polyethylene remains unstained and colorless.

Example 5

This example demonstrates the ability to control the thickness of the layers or regions by changing the concentration of the free radical initiator in the modifying formulation. The first formulation of the series was composed of 7.0% DuPont zonyl fluoroacrylate, 1.0% hexanedioldiacrylate, and 0.2% Irgacure 621 in decamethyltetrasiloxane. The photoinitiator, Irgacure 651, was decreased by diluting the starting formulation. The thickness of the phobic layer decreased stepwise and in a controlled manner when the membrane of Example 1 was processed as described in Example 1. This is shown in the following Table 1.

TABLE 1

| Weight % Initiator | % of Thickness Hydrophobic | % of Thickness Hydrophilic |
|---|---|---|
| 0.2 | 80 | 20 |
| 0.17 | 65 | 35 |
| 0.1 | 60 | 40 |
| 0.074 | 40 | 60 |
| 0.063 | 30 | 70 |
| 0.057 | 15 | 85 |
| 0.05 | 8 | 92 |

Example 6

The object of this experiment is to show that a PPA in a liquid carrier can be used. The PPA in this example is 2,2'-diphenyl-1-picrylhydrazyl (DPPH) (Sigma-Aldrich). An inkless felt tipped pen or equivalent is dipped into a 1% methanolic solution of DPPH and used to make markings on a sheet of hydrophilic DVPP membrane. The solution is applied in several locations with the volume delivered penetrating the membrane either fully or partially. The methanol is allowed to evaporate. The membrane is treated with the solution from Example 1, placed between 2 polyethylene sheets so that both sides of the membrane are covered to prevent oxygen from diffusing from either side and acting as a PPA. The specimen is then exposed to UV light, washed and dried as in Example 1.

Upon application of water over both sides of the membrane, wetting occurs only where the DPPH was applied and only in the form of the markings. This is due to the retardation of polymerization by the DPPH. The hydrophobic surface modification is then formed throughout the membrane except where the DPPH acts as a PPA. Wetting penetrated the full thickness of the membrane in those locations where the methanolic solution penetrated the full depth. In those locations where the methanolic solution only partially penetrated, the wetting likewise only partially penetrated the membrane depth.

The invention claimed is:

1. A coated porous membrane having a first porous surface, a second porous surface, and a continuous porous structure that extends throughout the membrane from the first to the second surface defining a thickness, said membrane having a patterned free radical polymerized crosslinked hydrophobic polymer coating that covers portions of said first porous surface and said second porous surface and extends to a predetermined and controlled depth from said first porous surface into said continuous porous structure, said depth extending through a depth ranging from 8-80% of the membrane thickness, wherein a portion of the membrane is contacted with an agent which prevents the polymer coating from polymerizing.

2. The membrane of claim 1, wherein the porous membrane comprises a hydrophilic polymer material.

3. The membrane of claim 2, wherein the porous hydrophilic membrane polymer material is polyvinylidene difluoride.

4. The membrane of claim 1, wherein said hydrophobic polymer coating material is polyacrylates.

5. The membrane of claim 1, wherein the agent which prevents the polymer from polymerizing contacts the second surface.

6. The membrane of claim 1, wherein the agent which prevents the polymer from polymerizing is oxygen.

7. The membrane of claim 1, wherein the agent which prevents the polymer from polymerizing is 2,2,diphenyl-1-picrylhydrazyl.

8. A coated porous hydrophilic membrane suitable for use in enzyme assays having a first porous surface, a second porous surface, and a continuous porous structure that extends throughout the hydrophilic membrane from the first to the second surface, said hydrophilic membrane having a free radical polymerized crosslinked hydrophobic polymer coating that;
    i) extends to a predetermined and controlled depth from said first porous surface into said continuous porous structure, said depth extending through a depth ranging from 8-80% of the membrane thickness; and
    ii) covers a portion of the first porous surface as a patterned coating;
    wherein a portion of the membrane is contacted with an agent which prevents the hydrophobic polymer coating from polymerizing.

9. The membrane of claim 8, wherein the hydrophilic porous membrane is selected form the group consisting of a microporous hydrophilic polymer membranes and ultrafiltration hydrophilic polymer membranes.

10. The membrane of claim 9, wherein the hydrophilic porous membrane material is polyvinylidene difluoride.

11. The membrane of claim 8, wherein said hydrophobic polymer coating material is polyacrylates.

12. The membrane of claim 8, wherein the patterned hydrophobic polymer coating that covers portions of the first surface and the second surface is a different pattern on each surface.

13. The membrane of claim 8, wherein the hydrophobic polymer coating does not wet with a liquid having a surface tension greater than about 21 mN/m.

14. A coated porous membrane having a first porous surface, a second porous surface, and a continuous porous structure that extends throughout the membrane from the first to the second surface defining a thickness, said membrane having a patterned free radical polymerized crosslinked hydrophobic polymer coating that covers said first porous surface and said first porous surface and extends about halfway through the depth of the membrane, wherein a portion of the membrane is contacted with an agent which prevents the polymer coating from polymerizing.

15. The membrane of claim 14, wherein the porous membrane comprises a hydrophilic polymer material.

16. The membrane of claim 15, wherein the porous hydrophilic membrane polymer material is polyvinylidene difluoride.

17. The membrane of claim 14, wherein said hydrophobic polymer coating material is polyacrylates.

18. The membrane of claim 14, wherein the hydrophilic porous membrane is selected form the group consisting of a microporous hydrophilic polymer membranes and ultrafiltration hydrophilic polymer membranes.

19. The membrane of claim 15, wherein the porous hydrophilic membrane polymer material is polyvinylidene difluoride.

20. The membrane of claim 14, wherein the patterned hydrophobic polymer coating that covers portions of the first surface and the second surface is a different pattern on each surface.

21. The membrane of claim 14, wherein the hydrophobic polymer coating does not wet with a liquid having a surface tension greater than about 21 mN/m.

* * * * *